United States Patent
Ratcliff et al.

(10) Patent No.: US 9,646,522 B2
(45) Date of Patent: May 9, 2017

(54) ENHANCED INFORMATION DELIVERY USING A TRANSPARENT DISPLAY

(75) Inventors: Joshua J. Ratcliff, San Jose, CA (US); Kenton M. Lyons, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 13/538,914

(22) Filed: Jun. 29, 2012

(65) Prior Publication Data

US 2014/0002486 A1    Jan. 2, 2014

(51) Int. Cl.
| | |
|---|---|
| G09G 5/02 | (2006.01) |
| G09G 3/00 | (2006.01) |
| G06F 3/01 | (2006.01) |
| G06F 3/0481 | (2013.01) |

(52) U.S. Cl.
CPC ............. G09G 3/003 (2013.01); G06F 3/011 (2013.01); G06F 3/017 (2013.01); G06F 3/04815 (2013.01)

(58) Field of Classification Search
CPC ... G06T 19/006; G09G 5/377; G09G 2340/10
USPC ........................................................ 345/633
See application file for complete search history.

(56) References Cited

U.S. PATENT DOCUMENTS

| | | | | |
|---|---|---|---|---|
| 5,625,765 | A | * | 4/1997 | Ellenby et al. ............... 345/633 |
| 6,064,749 | A | * | 5/2000 | Hirota et al. .................. 382/103 |
| 6,356,905 | B1 | * | 3/2002 | Gershman et al. .......... 705/26.8 |
| 6,369,952 | B1 | * | 4/2002 | Rallison et al. .............. 359/630 |
| 6,414,696 | B1 | * | 7/2002 | Ellenby et al. ................ 715/762 |
| 6,452,544 | B1 | * | 9/2002 | Hakala .................... G01C 21/20 342/357.31 |
| 8,264,505 | B2 | * | 9/2012 | Bathiche et al. ............. 345/633 |
| 8,373,725 | B2 | * | 2/2013 | Ryu et al. ..................... 345/633 |
| 8,681,178 | B1 | * | 3/2014 | Tseng ............................ 345/633 |
| 8,698,843 | B2 | * | 4/2014 | Tseng ............................ 345/633 |
| 8,711,176 | B2 | * | 4/2014 | Douris et al. ................. 345/633 |
| 8,730,312 | B2 | * | 5/2014 | Roebke et al. ................. 348/61 |
| 8,743,144 | B2 | * | 6/2014 | Takeshita ...................... 345/632 |
| 8,750,559 | B2 | * | 6/2014 | Sung et al. .................... 382/100 |

(Continued)

FOREIGN PATENT DOCUMENTS

| | | |
|---|---|---|
| CN | 101553752 | 10/2009 |
| CN | 102110379 | 6/2011 |
| EP | 1285331 | 6/2010 |
| WO | WO-9607947 | 3/1996 |
| WO | WO 03-060830 | 7/2003 |

OTHER PUBLICATIONS

"An Augmented Reality System for Astronomical Observations" A. Lintu; M. Magnor IEEE Virtual Reality Conference (VR 2006) Year: 2006.*

(Continued)

*Primary Examiner* — Javid A Amini
(74) *Attorney, Agent, or Firm* — Blakely, Sokoloff, Taylor & Zafman LLP

(57) ABSTRACT

Information is delivered about a particular external environment using a transparent display. In one embodiment, a method includes determining a position of a mobile transparent display, determining an orientation of the display, retrieving information about the environment of the display using the determined position and orientation, and overlaying the retrieved information over a view on the transparent display.

19 Claims, 6 Drawing Sheets

(56) References Cited

U.S. PATENT DOCUMENTS

| | | | |
|---|---|---|---|
| 8,903,430 B2* | 12/2014 | Sands | G01S 13/876 348/14.02 |
| 2002/0191004 A1* | 12/2002 | Ebersole | G09B 19/00 345/633 |
| 2008/0109159 A1* | 5/2008 | Shi et al. | 701/208 |
| 2008/0192048 A1* | 8/2008 | Nabais Nobre | G07F 17/02 345/419 |
| 2009/0132316 A1* | 5/2009 | Florance et al. | 705/7 |
| 2009/0167787 A1* | 7/2009 | Bathiche | A63F 13/10 345/633 |
| 2009/0289956 A1* | 11/2009 | Douris | G01C 21/3602 345/633 |
| 2009/0319178 A1* | 12/2009 | Khosravy et al. | 701/207 |
| 2013/0254670 A1* | 9/2013 | Eraker et al. | 715/738 |
| 2014/0160119 A1* | 6/2014 | Vincent | G06T 17/05 345/419 |

OTHER PUBLICATIONS

PCT Search Report, PCT/US2013/043893, Int. Filing Date Jun. 3, 2013, Applicant Intel Corporation, Mailing Date Nov. 26, 2013, 12 pages.
Chinese Search Report for CN Counterpart Application No. 201380027955.X, 3 pgs., (Jan. 25, 2016).
Chinese Search Report for CN Counterpart Application No. 201380027955.X, dated Jan. 25, 2016, 3 pages.

* cited by examiner

ENHANCED INFORMATION DELIVERY USING A TRANSPARENT DISPLAY

BACKGROUND

The advent of wireless data networks has allowed mobile devices, such as portable computers and smartphones, to provide data about a location to a person in that location almost immediately. A mobile device can report its location through a web browser or an application and be provided with information about restaurants, houses for sale, cultural events and more. This allows the user to be informed immediately about that location. Some web sites and applications also allow the user to interact with the information to focus on particular types of information or information about a particular topic or facility. For graphic information, the user may be able to zoom in or out or change a view from an overhead view to a street view, or from a map view to a pictorial view.

Some web sites and applications also allow the user to upload information back to the information provide through the wireless data network. The user can then add to what has been received with information about the location, such as current photographs, descriptions, or comments. This information can be consolidated with the existing information to allow more information to be provided to the next user.

One example of such location-based applications are astronomy applications. Such applications receive the location of the user device and the time of year and then provide images of how the night sky should appear at that location and time. Additional information is provided, such as the name and locations of constellations and planets. If the user has a view of the sky, then received information on the mobile device can be compared with the actual sky to locate and understand objects. Such an application can allow a person to learn about the sky in a remote or unfamiliar location. Similar functionality can also be obtained with fixed desktop equipment and software.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Using an eyeglass system, information can be presented in the same view as the real world view. Instead of looking at the screen of a mobile device and then applying what was seen to the real scene around the user, the content can be shown within or superimposed over the real scene. Not only does this make the information available more quickly, it may also afford hands free use and input through gestures.

In one embodiment, human vision is extended with a hands-free, 'augmented telescope' experience for viewing the night sky. In such an embodiment, a realistic rendering of the night sky is created that is accurately aligned with the user's view of the real night sky using inertial sensors or computer vision or both. The rendering is drawn superimposed on the user's view using an eyeglass augmented reality (AR) system. The rendering allows the user to receive additional information such as the names of celestial bodies, the names of objects that are too small or too far away to see with the naked eye, or logical entities such as constellations, presented as an overlay on the night sky view.

Figure 1:
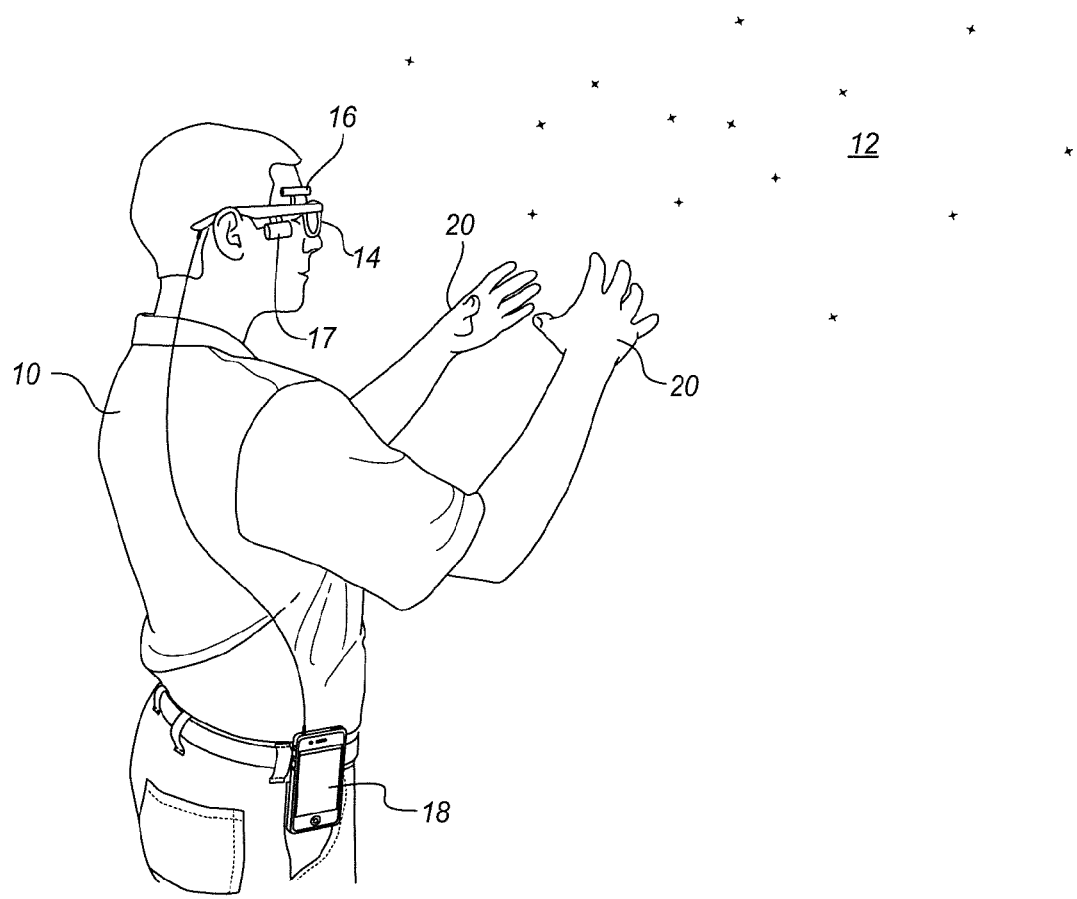
FIG. 1 is a diagram of a user enjoying an enhanced information view of a night sky using an eyeglasses display according to an embodiment of the invention.

FIG. 1, shows an example of the system in use. A user 10 is standing in view of the night sky 12, where stars, planets, comets, and perhaps a few airplanes can be seen. The viewer is looking through the transparent lenses of a pair of eyeglasses 14 which are equipped with a camera 16 and a projector 17. The eyeglasses may also be equipped with other devices such as positioning and inertial reference systems, among others (not shown). The camera looks out in the direction that the viewer is looking to see the viewer's view of the sky. The projector is able to project an image in front of the viewer either onto the lenses or out past the lenses. While the term projector is used, in the case of an electrochromic or transparent OLED display, images will not be projected as much as displayed, however, the same principles apply to such a display system as to a projector.

The camera and projector are coupled to a computing system 18, shown as a smartphone or small tablet in the present illustration, however, the computing system may be larger or smaller and take a variety of different form factors. The computing system may be physically attached or integrated into the eyeglasses, worn as a separate device, as shown, or be a fixed or separate hand carried device. The computing system may be coupled to the camera and projector through one or more cables as shown or wirelessly using any of a variety of different wireless communications systems. The computing system as illustrated includes buttons and a display which may be a touch surface for additional user input. The particular user interface may be adapted to suit the device and its applications.

Examples of a computing system 18 may include without limitation a mobile device, a personal digital assistant, a mobile computing device, a smart phone, a cellular telephone, a handset, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, or combination thereof."

The user is also shown as holding his hands 20 in view of the camera 16. Using the camera, the user can gesture with his hands to send commands to the computing system. The commands may call up a particular type of information on the display. Zoom in or out on the display, scan across the display in different directions, or select particular objects in the night sky. The gestures are observed by the camera and provided to the computing system which executes commands as a result, an audio or visual confirmation may be provided using speakers (not shown) in the eyeglasses or the computing system or using the projector.

Figure 2:
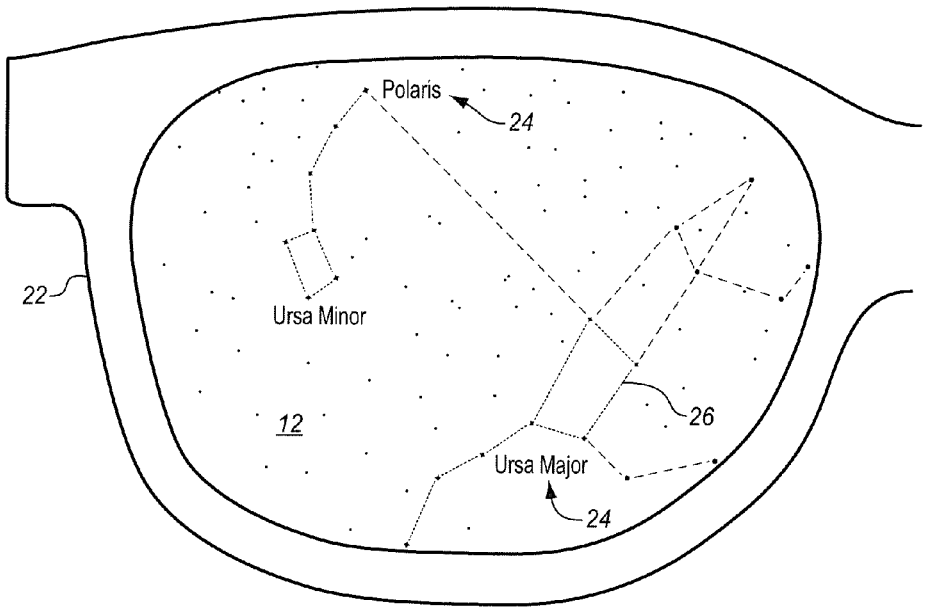
FIG. 2 is a diagram of an enhanced information view of a night sky as seen through a lens of a pair of eyeglasses according to an embodiment of the invention.

FIG. 2 shows an example of a view through a left lens 22 of the eyeglasses in the example FIG. 1 of viewing the night sky 12. A similar view will be seen through the right lens. The sky 12 is clear and visible through the transparent lens of the display. To enhance the user's understanding of what is being seen, the computing system has generated annotations 24, naming a constellation, Ursa Major, and naming a star, Polaris. These are displayed on the screen next to the appropriate item as seen through the glasses. The computing system does this by registering the view from the camera with the eyeglass lenses and then projecting an image in the appropriate location. In addition to the annotation, reference lines 26 are provided to show how the stars of the constellation are associated with each other. These are superimposed on the view of the real sky be displaying the lines on the appropriate place on the eyeglass lens.

Figure 3:
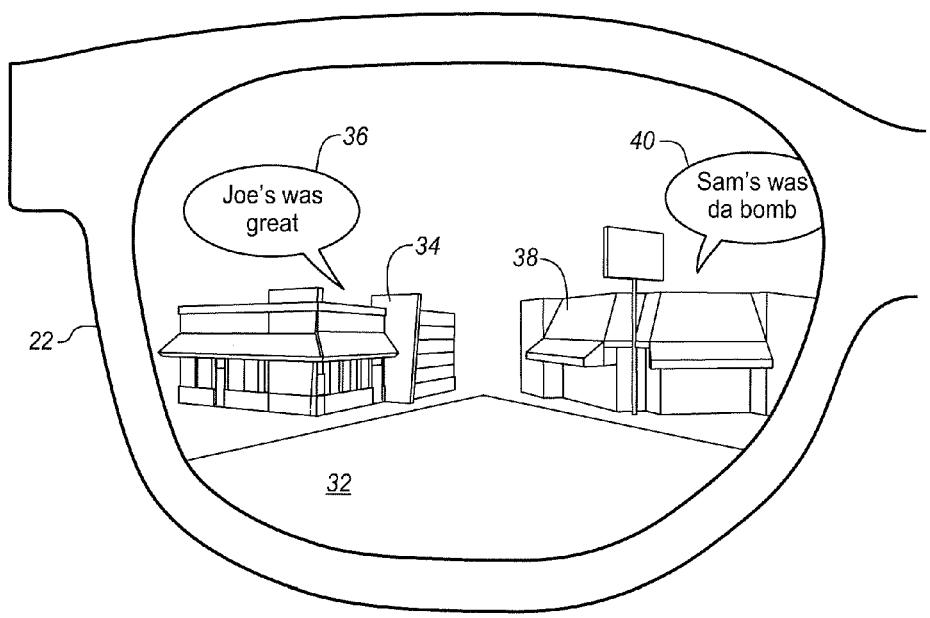
FIG. 3 is a diagram of an enhanced information view of an urban landscape as seen through a lens of a pair of eyeglasses according to an embodiment of the invention.

FIG. 3 is another example of how the system may be used with a different view. In this example, the user is looking across the street at two real restaurants, Joe's Restaurant 34 and Sam's Restaurant 38. The computing system, similar to the night sky has determined the user's position and orientation and identified the two restaurants at which the user is looking. The computing system then has generated annotations 36, 40 to enhance the user's experience of viewing the restaurants. In this example, the annotations are brief reviews, such as "Joe's was great!" and "Sam's was da bomb!" Other information may be provided on user command, such as hours of operation, menus, in-depth reviews, historical information about the restaurants, the chef, the buildings, or the street or any other information. Social networking features may also be provided through the computing system.

FIGS. 1-3 show that the present invention allows a clear view of the real world, such as the night sky, or an urban landscape, with free hand and head movements to enjoy the view and to control the enhancement of the view using hand gestures or other control methods. The system may be operated using gesture and voice commands or any other type of commands. Alternatively, or in addition, the user may perform some commands directly on the computing system, with or without using the display on the computing system. The computing system may have some or all of the provided data stored in memory.

Using a wireless data network, the computing device may also obtain current or additional information from remote servers and services. In the example of social networking, the user may also send and receive communications to others in the context of the view. After seeing Polaris, the user might send a message to another user such as, "I just saw Polaris and it is very clear tonight." In another example, the user might receive a message such as "Let's eat at Joe's. Meet me at 8:00."

Figure 4:
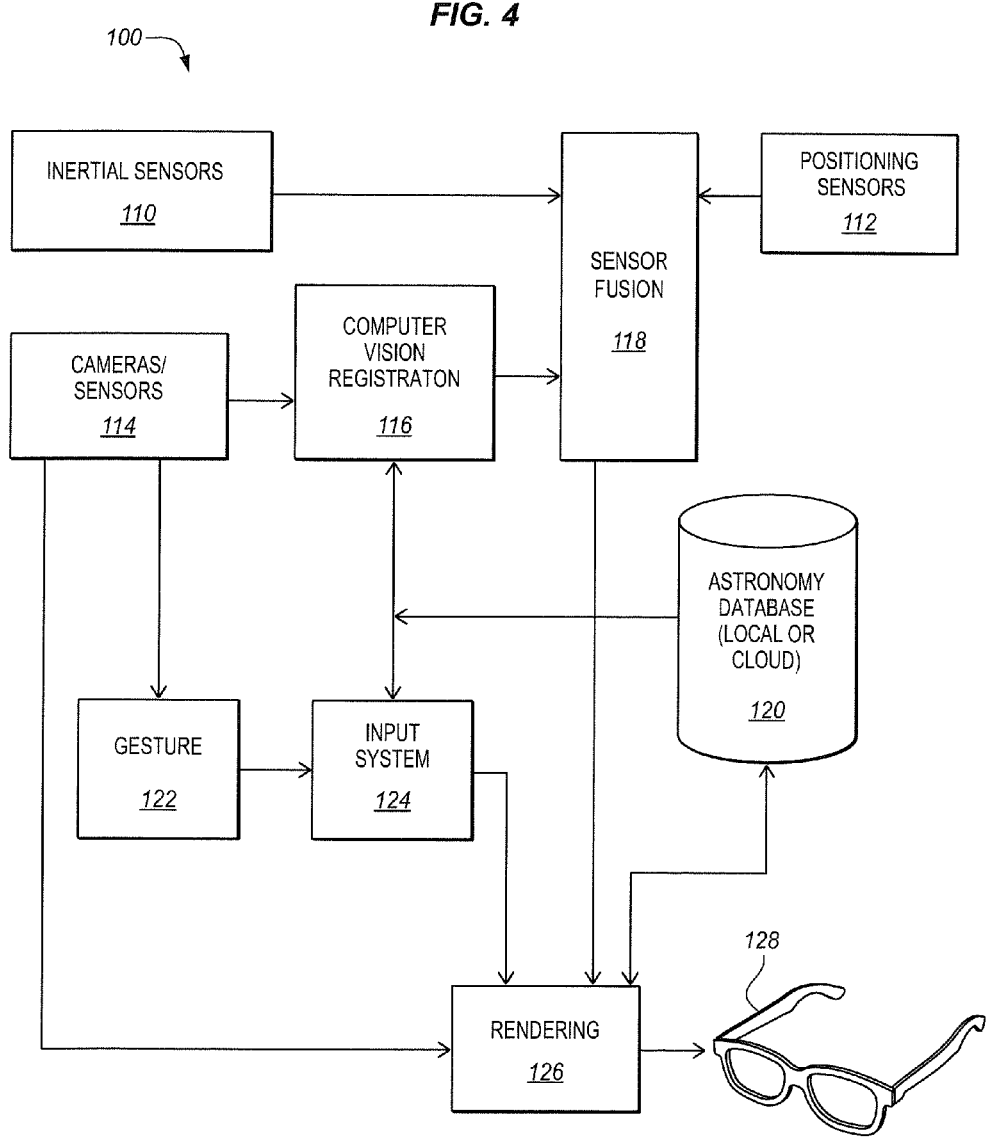
FIG. 4 is a block diagram of a system for delivering information including an eyeglass display according to another embodiment of the invention.

Referring to FIG. 4, the eyeglass viewing and enhancement system is described in more detail. Sensing components provide a variety of different inputs to the system 100. In one example, the system uses inertial sensors 110 and positioning sensors 112 to locate the user and determine the direction that the user is facing. The inertial sensors may include accelerometers, gyros, compasses, altimeters, etc. The positioning sensors may include a satellite location system, such as GPS (Global Positioning System) and other radio positioning systems, such as WiFi sensors, cellular tower location sensors, etc.

Another approach to positioning is to use a camera 114 to capture an image of the night sky. The camera may be assisted by the inertial and position sensors or, instead of these, other sensors. The camera may sense visible light or possibly other parts of the spectrum, e.g. infrared light. A computer vision registration system 116 may then use the captured image to determine the user's position and direction. In the illustrated example, all of these sensing techniques are combined through a sensor fusion system 118. However, the described sensors may be used independently or in other combinations.

The system also has an astronomy database. The database contains information about celestial objects and metadata, possibly including telescopic images, drawings and mythological references. The database may be stored locally as shown or accessed remotely through the cloud. The astronomy database may be used to render information on the display as described above. In addition, the astronomy database may be used by the computer vision registration system to help with the registration process. In one example, the computer vision system aligns the pattern of stars in the image captured by the camera with patterns in the database. For higher accuracy, several images may be captured and compared. The matched patterns that correspond to the same sky may be selected as the patterns for the user's current position. The computer vision registration system may also use a calendar and a clock to limit the total number of patterns to those for the sky as it can be seen on a particular night. Accurate day and time information may come from the positioning system, from internal memory, or from a remote astronomy database, for example. In addition, to an astronomy database, there may be other databases, such as restaurant information as shown above, or any other information that a user may desire about a thing being viewed.

The system may allow for a variety of different ways to provide user control inputs to the system. In one example, the camera that observes the night sky may be used to detect hand gestures made by the user. In the case of a system in which the entire system is mounted to a pair of eyeglasses, using the same camera reduces size and weight. An eyeglass mounted camera that is pointed in the direction that the user is facing will also be able to observe hand gestures that the user makes in front of the eyeglasses. The camera 114 is coupled to a gesture recognition system 122 that feeds the gestures as commands into a user input system 124. The user input system may also receive other commands. The user input system commands are provided to a rendering module 126 to control the operation of the system. Alternatively, or in addition, switches and sliders (not shown) may be provided on the system or a microphone may be provided to receive voice commands. These may also be sent to the user input system 124 for processing and handling and then fed to the rendering module.

The gesture input system may be used for any functions that the system provides. This may include changing modes, and pulling up different information about the objects viewed or displayed. Commands may be provided for specifying different types of enhancement such as making objects appear bigger than they really are so they can be seen more easily, or drawing objects that are too faint to be seen by the naked eye.

In one embodiment, commands may be provided for controlling a zoom function. A user may gesture toward a particular object, for example the planet Mars, which is far away or difficult to observe. This object is identified in the astronomy database and a stored image of Mars is retrieved from the database and projected as an overlay on the transparent display. The user, upon seeing this object overlaid on his view of the object, can then zoom in or out on the overlaid image. Since there is large catalog of publicly available imagery of Mars, almost any level of detail can be provided as the user zooms in on the selected object. The image can also be annotated with information about the surface, environment, size, human historical notes, and any other information about Mars, or another selected object. The same zooming function can also be provided for the urban landscape. A stored image of Joe's Restaurant can be retrieved from storage and projected onto the transparent display. The user can zoom in and using additional stored image even see the inside of the restaurant, some of the dishes, notable social events from the past, etc.

The rendering module 126 processes data coming from the sensing subsystem 118, the input system 124, and the database 120. It generates a virtual view of the night sky for the user. The rendering module may also obtain night sky view image data directly from the camera, enhance the image data, and then present it to the user. As a further alternative, the rendering module may overlay data from the database over the user's direct view. The particular mode of presentation may be fixed at manufacture or selected by the user. The view, whether a rendered view, an enhanced view, or an overlay for the direct view is then sent to an eyeglass display 128 for viewing. While an eyeglass display is shown any of a variety of other transparent displays may be used, including a helmet visor, or even a smartphone or tablet designed with a transparent display. The transparent display may be in the form of eyeglasses or a larger panel that is viewed at a greater distance. A transparent display may be made using optical projection techniques or a display technology, such as electrochromic and OLED (Organic Light Emitting Diode), that can be formed on a transparent panel.

Figure 5:
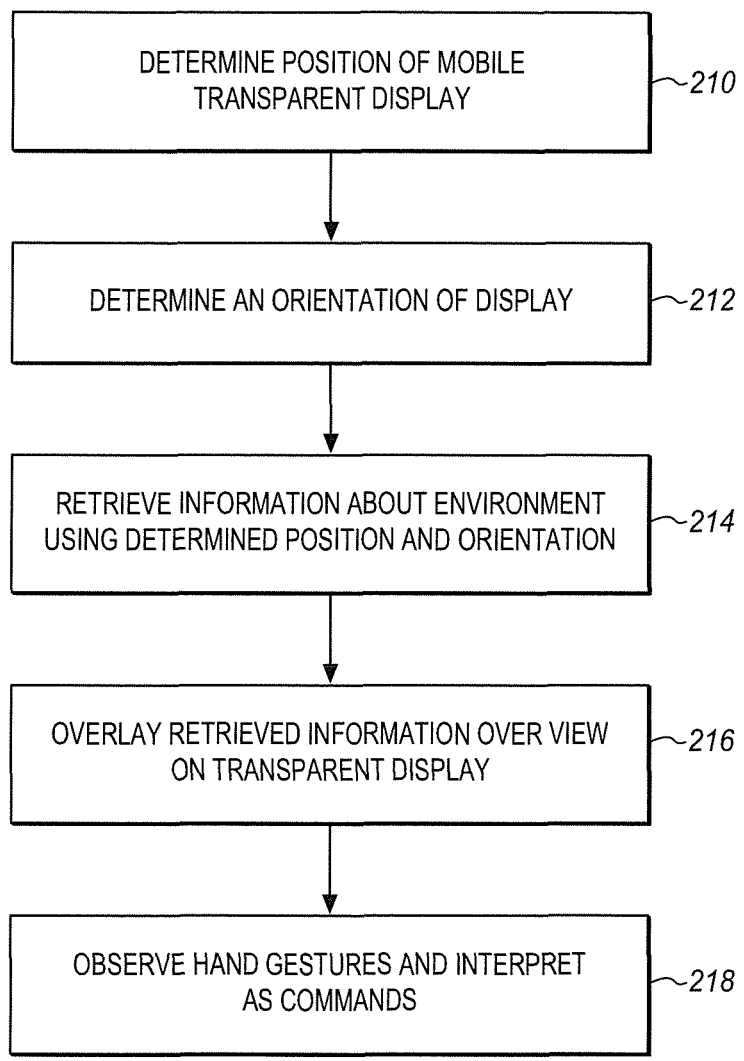
FIG. 5 is a process flow diagram of providing delivering information on a transparent display according to an embodiment of the invention.

FIG. 5 is an example process flow diagram for some of the operation describe above. In FIG. 5, the process begins with the user going to a location and activating the system. The system then determines the position of the system at 210. This system includes the mobile transparent display. The position of the system may be determined in any of a variety of different ways, using different types of equipment. This can include using radio global or local positioning systems from satellite, cellular network, data networks, and other local position systems. The user may also provide a position. As a further alternative, the camera of the system might be used to take an image of some landmarks which can then be applied to a library of landmarks to determine the position of the system.

The system next determines an orientation of the display. This may be done using a compass, attached to the display or using inertial reference systems. As an example, after an orientation is determined, an accelerometer might sense that the user has moved his head to the right. The orientation may then be adjusted to the right based on this information. An accelerometer might also be used for pitch to determine that the user has moved his head up and even for roll, to determine that the user has cocked his head to one side or the other. The information overlay may then be quickly adjusted to compensate for the user's motion. Accordingly, a three-axis yaw, pitch, and roll inertial system can be useful in such an application. The camera may also be used to determine orientation. As an example, if the position of the user is known and the camera observes Joe's Restaurant to the right of Sam's Restaurant, then the system can infer, using a reference image, the direction that the user is looking as well as his position.

Stated more clearly in one embodiment, the orientation of the display can be determined by first taking an image of the view of the user using the camera. This image can then be compared locally or at a remote site with reference images at the determined position. The reference image database may have multiple images corresponding to different rough positions, where each reference image is associated with a different orientation. In the case of a night sky, since the stars are very distant, the night sky appears to be about the same for viewers that are within a few hundred miles of each other. However, as a viewer scans across the sky from left to right or up and down, the view of the sky changes. For a street view, such as that of FIG. 3, the view can change as the viewer moves ten or twenty feet. The view also changes as the user scans left or right. However these changes are not so great and the changes by scanning up or down are not interesting from the perspective of identifying different restaurants at street level, for example. They may be interesting for other applications, such as identifying ski trails or mountains.

Using the comparisons, the system selects a reference image that corresponds to the image from the camera. This can be done using a variety of existing tools for comparing images. This image is associated with a particular orientation, as mentioned above, so the orientation associated with the selected reference image can then be used as the determined orientation for the display.

At 214, the determined position and orientation are used to retrieve information about the environment of the display. FIGS. 3 and 4 provide examples of the types of information that may be retrieved. However, any other information that a user might find interesting can be provided. Because the system is aware of what the user is seeing through the display, the presented information can be selected so that it is relevant to what the user is seeing. Other information such as e-mail, messages, stock reports, and news can also be shown, but these are not necessarily tied into what the user is seeing. This connection between the information on the display and the view through the display enhances the user's experience of the real world.

At 216, the retrieved information is overlaid over a view of the real scene on the transparent display. As explained above and shown in FIGS. 2 and 3 a view through the transparent display of a real scene is enhanced using additional information shown on the transparent display. The overlay may be approximate or general. In the example of FIG. 3 the restaurant reviews do not need to be located precisely on the display. However, in the example of FIG. 3, the lines that connect the stars of a constellation and the names of the stars are made more helpful if they are aligned closely to the positions of these things as seen by the user.

In one embodiment, the information overlay can be registered to the view through the display using the camera. The camera is oriented in the direction of the view on the transparent display. In a smartphone or tablet, this is called the rear camera. In a helmet of eyeglasses, this is called the forward camera. The image can be used by the computer system or a remote service to determine reference points in the view. The reference points can be related to the known objects in the view and the information concerning those objects. The overlaid information can then be positioned precisely, when desired, with respect to the reference points. The reference points can also provide scale and distance to the image so that the relative distance between the user and the objects can be determined. Using this information, the scale of the overlaid information can also be adjusted.

At 218, the user adjusts and controls the experience using hand gestures. The camera observes the hand gestures and interpreting these as commands to control the presentation of information on the transparent display. A wide range of different commands can be used, as suggested above, and these can be used together with voice commands and other parts of the input output interface of the computing system.

Figure 6:
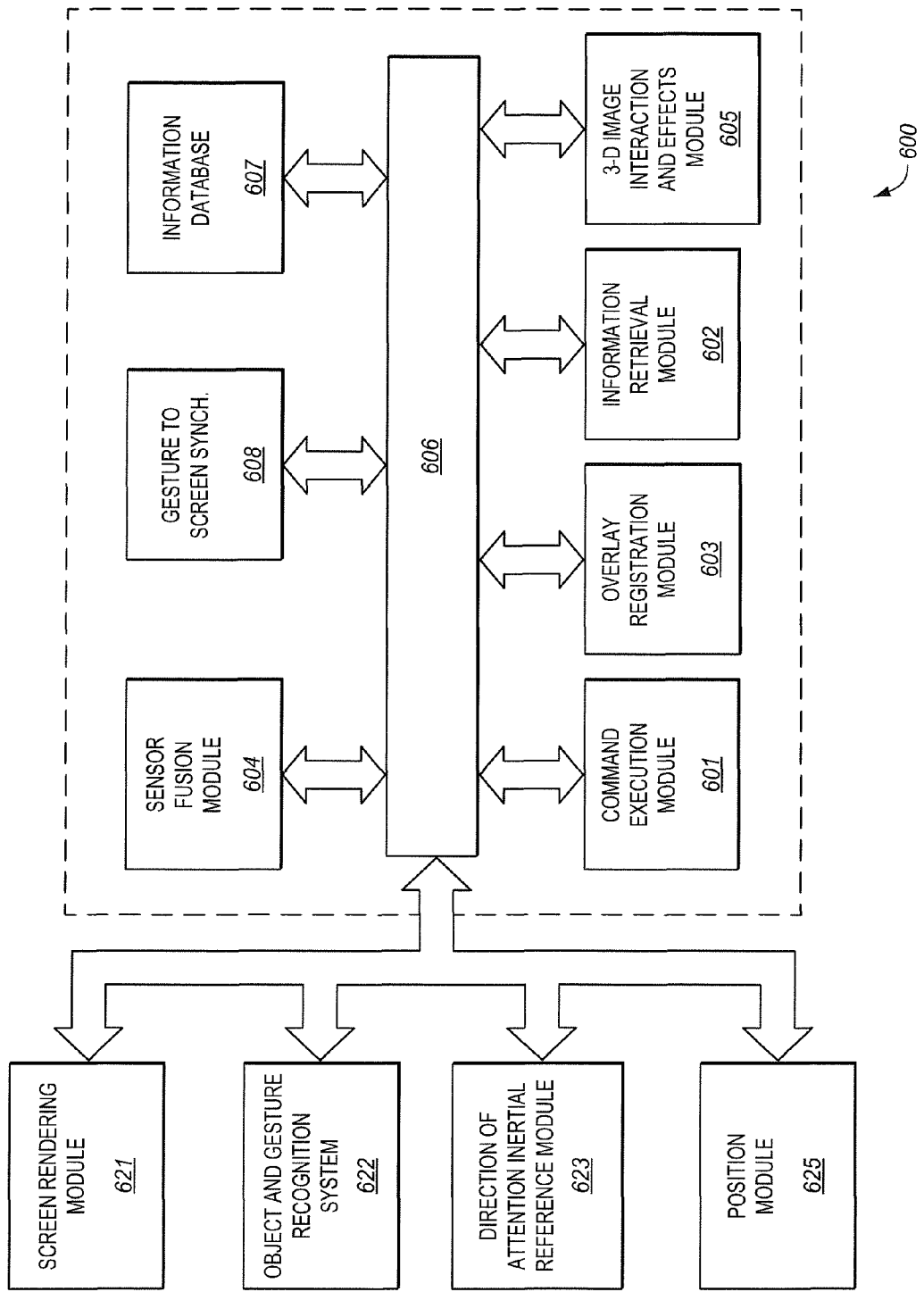
FIG. 6 is block diagram of a computer system suitable for implementing processes of the present disclosure according to an embodiment of the invention.

FIG. 6 is a block diagram of a computing environment capable of supporting the operations discussed above. The modules and systems can be implemented in a variety of different hardware architectures and form factors including that shown in FIG. 7. Input and output system are shown on the right side of the figure and computational systems are shown within the dotted line, but the particular physical configuration of components may be adapted to suit different implementations.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the transparent displays for the user to see. It can be adapted to receive the data from the Overlay Registration Module 603, described below, and to render the enhanced information and any other objects on the screens of the two eyeglass lenses or any other screen. Thus, the data from the Overlay Registration Module 603 would determine the position and dynamics of the retrieved information and the Screen Rendering Module would depict the information and associated objects and environment on a screen, accordingly.

The Object and Gesture Recognition System 622 may be adapted to recognize and track hand and arm gestures of a user. Such a module may be used to recognize hands, fingers, finger gestures, hand movements and a location of hands relative to displays and to observed objects in the real scene. For example, the Object and Gesture Recognition Module could for example determine that a user made a body part gesture to select or real or displayed object, or that the user made a body part gesture to expand or respond to a displayed object. The Object and Gesture Recognition System may be coupled to a camera or camera array, a microphone or microphone array, a touch screen or touch surface, or a pointing device, or some combination of these items, to detect gestures and commands from the user.

The Direction of Attention Module 623 may be equipped with cameras, inertial sensors, or other sensors to track the position and orientation of the transparent display, for example by tracking the movement of the user's head. The direction of attention module information may be provided to the Overlay Registration Module 603 to ensure that the information display is adjusted to compensate for movements of the user's head and changes in the real scene.

The Position Module 625 can use proximity sensors, compasses, GPS (global positioning system) receivers, personal area network radios, and other types of sensors, together with triangulation and other techniques to determine the position of the transparent display and its associated devices. Once a position is detected, it can be used to retrieve relevant information The Sensor Fusion Module 604 is adapted to receive input from the sensors 623, 625 and interpret these to determine position, orientation, and any other desired aspects of the systems position and orientation. The fusion sensor can establish an initial position and orientation and then make adjustments based on the data received from inertial sensors for yaw, pitch, and roll of the display. This information can be fed through a communication bus 606 to the Overlay Registration Module 603 among other to adjust the information provided to the Screen Rendering Module 621.

The Gesture to Screen Synchronization Module 608, receives the gesture information from the Object and Gesture Recognition System 622 and, in some cases, voice commands to determine whether gestures have been observed. Through the use of the Overlay Registration Module 603, the commands are then related to objects in the real scene or information provided by the system to interpret the gesture and its relationship to other objects experienced by the viewer. So, for example, this module will relate a selection command to a particular object in the real scene to generate a command. It then causes e.g. a gesture library to be used to interpret the gesture and provide it as a command for the Command Execution Module 601.

The Information Database 607, which may include or be coupled to external databases or information services, is coupled to the Information Retrieval Module 602 through the communications bus 606 to provide data with which the real scene may be enhanced. The data may be of any of the different types described above.

The Overlay Registration Module 603 as described above, receives the information from the Information Retrieval Module 602, aligns it to the real scene observed by the cameras and provides the scaled and registered information to the Screen Rendering Module 621.

The Information Retrieval Module 602 uses the determined position and orientation information to retrieve information from the Information Database 607 to provide to the user. The nature of the information may be preselected by the user or an application and then modified by the user command. Alternatively, the Information Retrieval Module may determine information to provide based on the determined user position and direction of attention. For a night sky, astronomical information might be obtained, while for a city street at night, information about the buildings on the street might be obtained. The user may also select default information types or initiate the system using an application or selections configured for a particular type of information.

The 3-D Image Interaction and Effects Module 605 tracks user interaction in 3-D with the real scene and generates a 3-D perspective for retrieved information. For example, information about a restaurant can be made to appear at a distance corresponding to the distance of the restaurant. Information about an object in the foreground can be rendered by the 3-D Image Interaction and Effects Module 605 in the foreground on the display. For an eyeglass display 3-D effects can be rendered simply and effectively.

Figure 7:
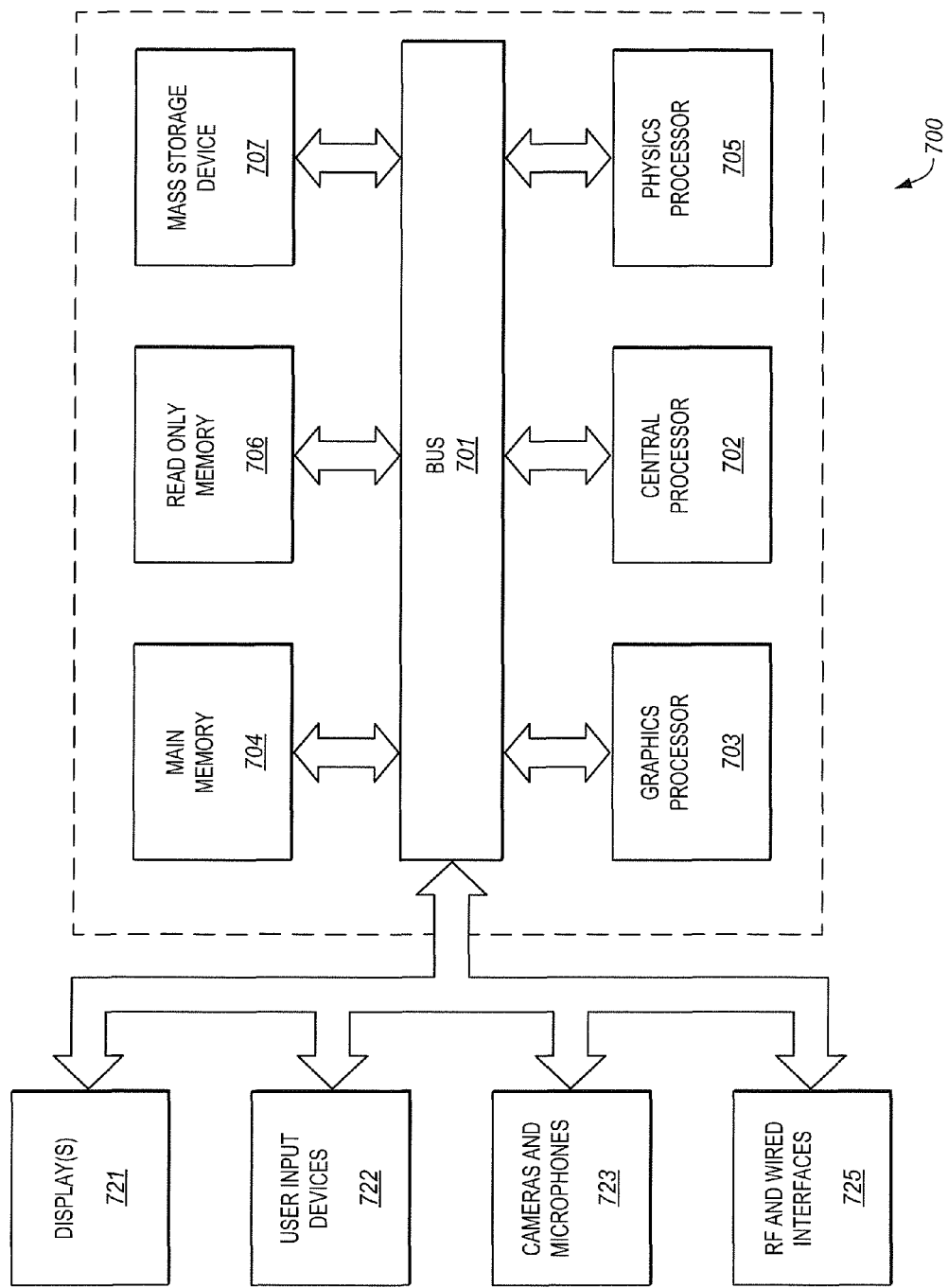
FIG. 7 is a block diagram of a an alternative view of the computer system of FIG. 8 suitable for implementing processes of the present disclosure according to an embodiment of the invention.

FIG. 7 is a block diagram of a computing system, such as a personal computer, portable gaming device, smartphone or tablet. Input and output system are shown on the right side of the figure and computational systems are shown within the dotted line, but the particular physical configuration of components may be adapted to suit different implementations. The computer system 700 includes a bus or other communication means 701 for communicating information, and a processing means such as a microprocessor 702 coupled with the bus 701 for processing information. The computer system may be augmented with a graphics processor 703 specifically for rendering graphics through parallel pipelines and a physics processor 705 for calculating physics interactions to enhance the presentation of information and effects. These processors may be incorporated into the central processor 702 or provided as one or more separate processors.

The computer system 700 further includes a main memory 704, such as a random access memory (RAM) or other dynamic data storage device, coupled to the bus 701 for storing information and instructions to be executed by the processor 702. The main memory also may be used for storing temporary variables or other intermediate information during execution of instructions by the processor. The computer system may also include a nonvolatile memory 706, such as a read only memory (ROM) or other static data storage device coupled to the bus for storing static information and instructions for the processor.

A mass memory 707 such as a magnetic disk, optical disc, or solid state array and its corresponding drive may also be coupled to the bus of the computer system for storing information and instructions. The computer system can also be coupled via the bus to a transparent display device or monitor 721, such as a projector, Liquid Crystal Display (LCD) or Organic Light Emitting Diode (OLED) array, for displaying information to a user. Graphical and textual indications of installation status, operations status and other information may be presented to the user on the display device, in addition to the various views and user interactions discussed above.

Typically, user input devices 722, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 721.

Camera and microphone arrays 723 are coupled to the bus to observe gestures, record audio and video and to receive visual and audio commands as mentioned above.

Communications interfaces 725 are also coupled to the bus 701. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, servers, and display devices via a network infrastructure or a peripheral attachment interface, including an Intranet or the Internet, for example.

It is to be appreciated that a lesser or more equipped system than the example described above may be preferred for certain implementations. Therefore, the configuration of the exemplary systems 600 and 700 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable storage medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following examples pertain to further embodiments. Specifics in the examples may be used anywhere in one or more embodiments. In one embodiment, a method comprises determining a position of a mobile transparent display, determining an orientation of the display, retrieving information about the environment of the display using the determined position and orientation, and overlaying the retrieved information over a view on the transparent display.

Further embodiments include the method wherein determining an orientation comprises determining the direction in which the display is oriented and inferring what may be seen through the transparent display and wherein determining an orientation comprises using a compass, and wherein determining an orientation comprises using accelerometers, and wherein determining an orientation comprises using a camera facing the direction of the view on the transparent display, and wherein determining an orientation includes determining a pitch.

Further embodiments include any of the above methods wherein determining an orientation comprises comparing an image from the camera to reference images at the determined position, each reference image being associated with an orientation, selecting a reference image corresponding to the image from the camera, and using the orientation associated with the selected reference image as the determined orientation.

Further embodiments include any of the above methods wherein overlaying the information comprises using a camera oriented in the direction of the view on the transparent display to determine reference points in the view and positioning the overlaid information with respect to the reference points, and wherein the reference points are identified as stars and the information is information concerning an identified star.

Further embodiments include any of the above methods also including observing user hand gestures and interpreting the observed gestures as commands to control the presentation of information on the transparent display.

In additional embodiments, a machine-readable medium has instructions stored thereon, that when operated on by the machine cause the machine to perform the operations of any one or more of the above methods.

In another embodiment an apparatus comprises a transparent display, a positioning system to determine a position of the display, an orientation system to determine an orientation of the display, and a computing system to receive the determined position and orientation, to retrieve information about objects in view of a user viewing through the transparent display, and to overlay information on the transparent display over the view of the user.

Further embodiments also include a wireless communications interface coupled to the computing system to send the position and orientation information to a remote server and to receive the information about objects from the remote server. In addition a camera may be included to observe real objects in view of the display, wherein the computing system determines reference points in the objects observed by the camera and positions the overlaid information with respect to the reference points. The camera may be oriented in the direction of the view of the user through the transparent display to observe user gestures and wherein the computing system interprets the observed user gestures as commands to control the presentation of information on the transparent display. The transparent display may be head-mounted and in the form of eyeglasses that project information in the view of the user through the lenses of the eyeglasses.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   determining a position of a mobile transparent display;
   determining an orientation of the display;
   determining information using the determined position and orientation about a particular celestial object in a user's view of the sky through the display;
   receiving a gesture toward the particular object using a camera associated with the mobile transparent display;
   retrieving a first stored image of the particular object from an astronomy database and projecting the first image as an overlay on the display;
   retrieving a second stored image of the particular object from the database, the second stored image being a zoomed in image with respect to the first image, and projecting the second image as an overlay on the display instead of the first image in response to the zoom gesture; and
   observing user hand gestures using the camera and interpreting the observed gestures as commands to control the presentation of information on the transparent display to present different images of the articular object.

2. The method of claim 1, wherein determining an orientation comprises determining the direction in which the display is oriented and inferring what may be seen through the transparent display.

3. The method of claim 1, wherein determining an orientation comprises using at least one of a compass, accelerometers, a pitch sensor and a camera facing the direction of the view on the transparent display.

4. The method of claim 1, wherein determining an orientation comprises using a camera facing the direction of the view on the transparent display, comparing an image from the camera to reference images at the determined position, each reference image being associated with an orientation, selecting a reference image corresponding to the image from the camera, and using the orientation associated with the selected reference image as the determined orientation.

5. The method of claim 1, wherein determining an orientation comprises tracking movement of a user's head, the method further comprising adjusting an apparent position of the overlayed information to compensate for the tracked movements.

6. The method of claim 1, wherein overlaying the information comprises using a camera oriented in the direction of the view on the transparent display to determine reference points in the view and positioning the overlaid information with respect to the reference points.

7. The method of claim 1, further comprising:
   receiving a command through a user gesture to call up a particular type of information on the display;
   retrieving information, such as names, categories, and connections, about the environment of the display using the determined position and orientation in response to the command; and
   overlaying the retrieved information over a view on the transparent display.

8. A machine-readable non-transitory medium having instructions stored thereon, that when operated on by the machine cause the machine to perform operations comprising:
   determining a position of a mobile transparent display;
   determining an orientation of the display;
   determining information using the determined position and orientation about a particular celestial object in a user's view of the sky through the display;

receiving a gesture toward the particular object using a camera associated with the mobile transparent display;

retrieving a first stored image of the particular object from an astronomy database and projecting the first image as an overlay on the display; and retrieving a second stored image of the particular object from the database, the second stored image being a zoomed in image with respect to the first image, and projecting the second image as an overlay on the display instead of the first image in response to the zoom gesture; and observing user hand gestures using the camera and interpreting the observed gestures as commands to control the presentation of information on the transparent display to present different images of the particular object.

9. The medium of claim 8, wherein determining an orientation comprises determining the direction in which the display is oriented using compass and inferring what may be seen through the transparent display.

10. The medium of claim 8, wherein determining an orientation comprises comparing an image from the camera to reference images at the determined position, each reference image being associated with an orientation, selecting a reference image corresponding to the image from the camera, and using the orientation associated with the selected reference image as the determined orientation.

11. The medium of claim 8, wherein the particular object is identified as a celestial object, the operations further comprising:

receiving a command through a user gesture to call up a particular type of information on the display;

retrieving information about the environment of the display using the determined position and orientation in response to the command; and overlaying the retrieved information over a view on the transparent display, wherein the information is information concerning an environment, surface, and size of the identified celestial object.

12. An apparatus comprising:

a transparent display;

a positioning system to determine a position of the display;

an orientation system to determine an orientation of the display;

a computing system to receive the determined position and orientation, to determine information about celestial objects in view of a user of the sky viewing through the transparent display, to receive a gesture toward a particular object in a user's view through the display using a camera associated with the mobile transparent display, to retrieve a first stored image of the particular object from an astronomy database and project the first image as an overlay on the display in response to the received gesture, to receive a gesture to zoom in on the particular object using the camera associated with the mobile transparent display, to retrieve a second stored image of the particular object from the database in response to the received zoom gesture, the second stored image being a zoomed in image with respect to the first image, and to project the second image as an overlay on the display instead of the first image, to observe user hand gestures using the camera and interpreting the observed gestures as commands to control the presentation of information on the transparent display to resent different images of the particular object; and a wireless communications interface coupled to the computing system to send the position and orientation information to a remote server and to receive the information from the database about objects from the remote server.

13. The apparatus of claim 12, further comprising a gesture to screen synchronization module to receive gesture information from a camera of the apparatus to relate the gesture to the particular object and to interpret the gesture.

14. The apparatus of claim 12, further comprising a camera to observe real objects in view of the display, wherein the computing system determines reference points in the objects observed by the camera and positions the overlaid information with respect to the reference points.

15. The apparatus of claim 12, further comprising a camera oriented in the direction of the view of the user through the transparent display to observe user gestures and wherein the computing system interprets the observed user gestures as commands to control the presentation of information on the transparent display.

16. The apparatus of claim 12, wherein the transparent display is head-mounted.

17. The apparatus of claim 16, wherein the transparent display is in the form of eyeglasses that project information in the view of the user through the lenses of the eyeglasses.

18. The method of claim 7, wherein the particular object is identified as a star and the information is information concerning a constellation that includes the identified object including lines that connect to other stars of the constellation.

19. The method of claim 1, further comprising receiving a user gesture toward the particular object using a camera associated with the mobile transparent display and wherein retrieving and projecting the first stored image is in response to the user gesture.

* * * * *